(12) United States Patent
Kumar et al.

(10) Patent No.: US 8,296,348 B2
(45) Date of Patent: Oct. 23, 2012

(54) ENCODING AND DECODING DATA ARRAYS

(75) Inventors: Roger Kumar, San Francisco, CA (US); Maynard Handley, Cupertino, CA (US); Thomas Pun, Sunnyvale, CA (US); Xiaochun Nie, Cupertino, CA (US); Hsi-Jung Wu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1253 days.

(21) Appl. No.: 12/037,061

(22) Filed: Feb. 25, 2008

(65) Prior Publication Data
US 2008/0147765 A1    Jun. 19, 2008

Related U.S. Application Data

(62) Division of application No. 10/427,556, filed on Apr. 30, 2003, now Pat. No. 7,379,956.

(60) Provisional application No. 60/396,156, filed on Jul. 14, 2002.

(51) Int. Cl.
*G06F 17/14* (2006.01)
(52) U.S. Cl. ...................................................... 708/401
(58) Field of Classification Search ................... 708/401
See application file for complete search history.

(56) References Cited

U.S. PATENT DOCUMENTS

| | | | |
|---|---|---|---|
| 5,550,765 A | 8/1996 | Bhattacharya et al. | |
| 5,701,263 A * | 12/1997 | Pineda | ........................... 708/402 |
| 5,754,456 A | 5/1998 | Eitan et al. | |
| 5,754,457 A | 5/1998 | Eitan et al. | |
| 6,175,653 B1 | 1/2001 | De Queiroz | |
| 6,189,021 B1 * | 2/2001 | Shyu | ............................. 708/401 |
| 6,243,730 B1 | 6/2001 | Wang | |
| 6,298,166 B1 | 10/2001 | Ratnakar et al. | |
| 6,680,972 B1 | 1/2004 | Liljeryd et al. | |
| 6,871,208 B1 | 3/2005 | Guo et al. | |
| 7,020,671 B1 | 3/2006 | Saha | |
| 7,376,280 B2 | 5/2008 | Handley et al. | |
| 7,379,956 B2 | 5/2008 | Kumar et al. | |
| 2004/0047512 A1 | 3/2004 | Handley et al. | |

(Continued)

FOREIGN PATENT DOCUMENTS
WO    WO 2004/030369    4/2004

OTHER PUBLICATIONS

Updated portions of prosecution history of U.S. Appl. No. 10/427,889, Nov. 11, 28, 2007, Handley, Maynard, et al.

(Continued)

*Primary Examiner* — Tan V. Mai
(74) *Attorney, Agent, or Firm* — Adeli & Tollen, LLP

(57) ABSTRACT

Some embodiments of the invention provide a method of performing a Discrete Cosine Transform ("DCT") encoding or decoding coefficients of a data array by (1) multiplying the coefficients by a scalar value before the encoding or decoding, and then (2) dividing the encoded or decoded coefficients by the scalar value. When used in conjunction with fixed-point arithmetic, this method increases the precision of the encoded and decoded results. In addition, some embodiments provide a method of performing a two-dimensional (2D) Inverse Discrete Cosine Transform ("iDCT"). This method splits a pre-multiplication operation of the iDCT into two or more separate stages. When used in conjunction with fixed-point arithmetic, this splitting increases the precision of the decoded results of the iDCT.

22 Claims, 4 Drawing Sheets

U.S. PATENT DOCUMENTS

2008/0232475 A1    9/2008    Handley et al.

OTHER PUBLICATIONS

Portions of prosecution history of U.S. Appl. No. 12/111,189, Jul. 2, 2008, Handley, Maynard, et al.

Updated portions of prosecution history of U.S. Appl. No. 10/427,556, Feb. 14, 2008, Kumar, Roger, et al.

Cabeen, Ken, et al., "Image Compression and the Discrete Cosine Transform," Math 45, College of the Redwoods, month unknown, 1998, pp. 1-11, College of the Redwoods, California, USA.

Notice of Allowance of U.S. Appl. No. 10/427,889, Jan. 7, 2008 (mailing date), Handley, Maynard, et al.

Non-Final Office Action of U.S. Appl. No. 10/427,889, May 31, 2007 (mailing date), Handley, Maynard, et al.

Non-Final Office Action of U.S. Appl. No. 10/427,889, Sep. 26, 2006 (mailing date), Handley, Maynard, et al.

Basoglu, et al., "The Equator MAP-CA DSP: An End-to-End Broadband Signal Processor VLIW," IEEE Trans. Circuits and Systems for Video Technology, vol. 12, No. 8, Aug. 2002, pp. 646-659.

Bhaskaran, et al., Image and Video Compression: Standards Algorithms and Architectures, $2^{nd}$ Edition, Month N/A 1997, pp. 150, 151, 188.

Notice of Allowance of U.S. Appl. No. 10/427,556, Nov. 5, 2007 (mailing date), Kumar, Roger, et al.

Final Office Action of U.S. Appl. No. 10/427,556, Mar. 5, 2007 (mailing date), Kumar, Roger, et al.

Non-Final Office Action of U.S. Appl. No. 10/427,556, Aug. 4, 2006 (mailing date), Kumar, Roger, et al.

Requirement for Restriction/Election of U.S. Appl. No. 10/427,556, Apr. 11, 2006 (mailing date), Kumar, Roger, et al.

* cited by examiner

ENCODING AND DECODING DATA ARRAYS

CLAIM OF BENEFIT TO PRIOR APPLICATION

This Application is a divisional application of an earlier filed U.S. Non-Provisional patent application Ser. No. 10/427,556, entitled "Encoding and Decoding Data Arrays," filed Apr. 30, 2003, now U.S. Pat. No. 7,379,956. U.S. Non-Provisional patent application Ser. No. 10/427,556 claims benefit of the earlier-filed U.S. Provisional Patent Application 60/396,156, entitled "Method and Apparatus for Coding and Decoding," filed Jul. 14, 2002. Both of the above-mentioned applications, namely Ser. No. 10/427,556 and 60/396,156, are incorporated herein by reference.

FIELD OF THE INVENTION

The present invention is directed towards encoding and decoding data arrays using separate pre-multiplication stages.

BACKGROUND OF THE INVENTION

Moving Picture Experts Group (MPEG) video compression is currently used in many video products such as digital television set-top boxes, DSS, HDTV decoders, DVD players, video conferencing, Internet video, and other applications. These products benefit from MPEG video compression since compressed video requires less storage space for video information and less bandwidth for the transmission of the video information.

An MPEG video is a sequence of video frames comprised of intra coded I-frames and/or inter coded P and B-frames, as is well known in the art. Each video frame is typically divided into sub-sections of macro blocks (16×16 pixels in a data array). A macro block typically includes sub-sections of four luminance blocks and two chrominance blocks (8×8 data arrays). A luminance block specifies brightness information (e.g., luminance image coefficients) about the pixels in the block, while the two chrominance blocks specify Cr and Cb color information (e.g., Cr and Cb image coefficients) about the pixels in the macro block.

MPEG video encoding and decoding processes typically use discrete cosine transform ("DCT") and inverse DCT ("iDCT") to encode and decode coefficients of a block (i.e., data array). A DCT operation takes image values defined in a spatial domain and transforms them into a frequency domain. The DCT operation transforms the inputted image values into a linear combination of weighted basis functions. These basis functions are the frequency components of the inputted image values. As such, when a DCT operation is applied to a block of image values, it yields a block of weighted values corresponding to how much of each basis function is present in the original image to be encoded.

For most images, most of the image information lies at low frequencies which appear in the upper-left corner of the DCT-encoded block. The lower-right values of the DCT-encoded block represent higher frequencies, and are often small enough to be neglected with little visible distortion. The top left corner value in the DCT-encoded block is the DC (zero-frequency) component and lower and rightmore entries represent larger vertical and horizontal spatial frequencies.

The DCT operation is a separable transform in that the matrix that defines this transformation is decomposable into two matrices, one that corresponds to a column transform and another that corresponds to a row transform. Thus it can be implemented as two one-dimensional (1D) transforms. In other words, a two-dimensional (2D) DCT is just a 1D DCT applied twice, once in the column direction and once in the row direction. In the case of a 1D 8-point DCT, the first coefficient (the DC coefficient) represents the average value of the image values and the eighth coefficient represents the highest frequencies found in the image. An iDCT operation is used to convert the frequency coefficients back into the image information.

DCT encoding of a block is a two-dimensional (2D) transformation operation that can be expressed by the following formula:

$$F(u,v) = \frac{C_u}{2}\frac{C_v}{2}\sum_{y=0}^{7}\sum_{x=0}^{7} f(x,y)\cos\left[\frac{(2x+1)u\pi}{16}\right]\cos\left[\frac{(2y+1)v\pi}{16}\right]$$

with:

$$C_u = \begin{cases} \frac{1}{\sqrt{2}} & \text{if } n=0, \\ 1 & \text{if } u>0 \end{cases};$$

$$C_v = \begin{cases} \frac{1}{\sqrt{2}} & \text{if } v=0, \\ 1 & \text{if } v>0 \end{cases}$$

In the formula above, a column dimension of the block is represented by x values and a row dimension of the block is represented by y values, so that f(x,y) is the image information at position [x,y] of the block. As such, F(u,v) is the 2D encoded image information at position [u,v] of the 2D encoded block.

A DCT decoder performs an inverse DCT transformation on a DCT encoded block to reconstruct the block. DCT decoding of a block is also a two-dimensional (2D) transformation operation, which can be expressed by the following formula:

$$f(x,y) = \sum_{u=0}^{7}\sum_{v=0}^{7} F(u,v)\frac{C_u}{2}\frac{C_v}{2}\cos\left[\frac{(2x+1)u\pi}{16}\right]\cos\left[\frac{(2y+1)v\pi}{16}\right]$$

In the formula above, the columns of the 2D encoded block are represented by u values and the rows of the 2D encoded block are represented by v values, so that F(u,v) is the encoded image data at position [u,v] of the block. As such, f(x,y) is the image data at position [x,y] of the block.

Conventionally, 2D DCT and 2D iDCT processes contain a pre-multiply stage that multiplies each coefficient of the block to be transformed by a pre-multiplication value. The pre-multiplication value is usually less than one. As such, the pre-multiplication operation results in the loss of precision, when it is used in conjunction with fixed point arithmetic that rounds or truncates the multiplication results.

SUMMARY OF THE INVENTION

Some embodiments of the invention provide a method of performing a Discrete Cosine Transform ("DCT") encoding or decoding coefficients of a data array by (1) multiplying the coefficients by a scalar value before the encoding or decoding, and then (2) dividing the encoded or decoded coefficients by the scalar value. When used in conjunction with fixed-point arithmetic, this method increases the precision of the encoded and decoded results.

In addition, some embodiments provide a method of performing a two-dimensional (2D) Inverse Discrete Cosine Transform ("iDCT"). This method splits a pre-multiplication operation of the iDCT into two or more separate stages. When used in conjunction with fixed-point arithmetic, this splitting increases the precision of the decoded results of the iDCT.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method of performing a Discrete Cosine Transform ("DCT") encoding or decoding of coefficients of a data array by (1) multiplying the coefficients by a scalar value before the encoding or decoding, and then (2) dividing the encoded or decoded coefficients by the scalar value. When used in conjunction with fixed-point arithmetic, this method increases the precision of the encoded and decoded results.

In addition, some embodiments provide a method of performing a two-dimensional (2D) Inverse Discrete Cosine Transform ("iDCT"). This method splits a pre-multiplication operation of the iDCT into two or more separate stages. When used in conjunction with fixed-point arithmetic, this splitting increases the precision of the decoded results of the iDCT.

Several embodiments are described below by reference to FIGS. 1 to 4. These embodiments are part of an MPEG encoder or decoder that encodes or decodes video frames by using 2D DCT and IDCT operations on 8-by-8 image blocks (i.e., data arrays). One of ordinary skill, however, will realize that other embodiments might use other compression techniques (e.g., H.263 compression). Alternatively, other embodiments might use other types of transformations (such as those used in MPEG 4 part 10). Also, other embodiments might apply their transform operations on different size blocks, such as 4×4, 8×4, or any n×m set of pixels, where n and m are integers.

DCT decoding is a separable two-dimensional (2D) transform operation. The separable nature of the iDCT decoding can be exploited by (1) performing a first 1D iDCT process in the column direction of the 2D encoded block to produce a 1D encoded block and then a second 1D iDCT process in the row direction of the encoded block to produce the block. Alternatively, the first 1D iDCT operation can be performed in the row direction of the 2D encoded block and the second 1D iDCT operation can be performed in the column direction of the encoded block.

The scaled-version of the Chen method can be used to perform two 1D iDCT operations. This scaled-version is described in the paper "2D Inverse Discrete Cosine Transform," which can be found on the internet, incorporated herein by reference. The Chen algorithm is an efficient implementation of the iDCT operation that requires a fewer number of computations than a straightforward implementation of the iDCT.

Figure 1:
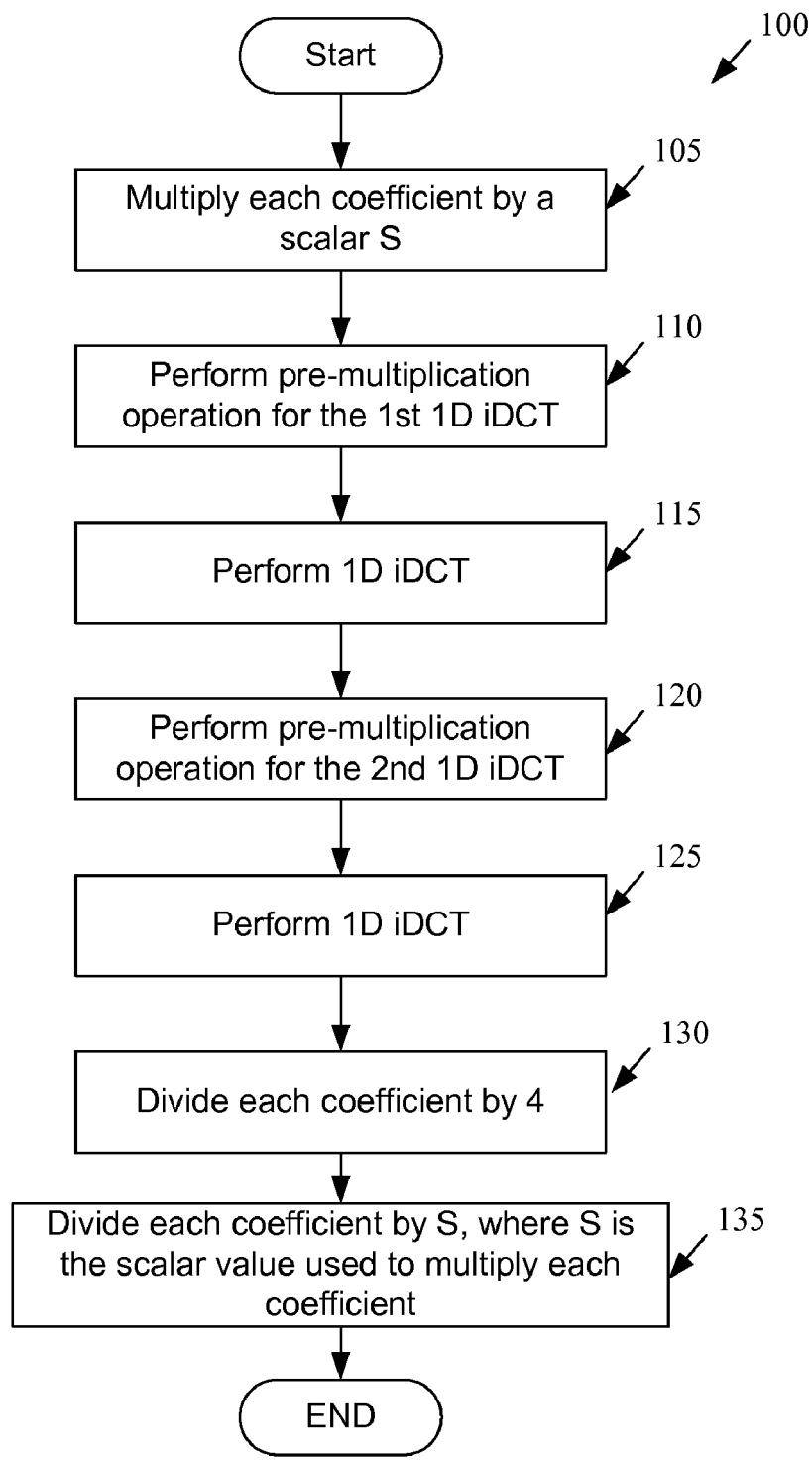
FIG. 1 illustrates a process that performs a 2D iDCT operation.

FIG. 1 illustrates a process 100 that performs a 2D iDCT operation. This process decodes a data array of coefficients that were encoded using a DCT operation. As shown in FIG. 1, the process 100 initially multiplies (at 105) each coefficient in the data array by a scalar value S. In some embodiments, the scalar value is 16. These embodiments perform the multiplication by shifting up each coefficient in the data array by four bits. Some of these embodiments shift up each coefficient by four bits since (1) in these embodiments, each coefficient in the data array can be represented by a 12 bit value, and (2) these embodiments perform 16×16 fixed point multiplication. A 16×16 fixed point multiplication multiplies two 16 bit values to obtain a 32 bit value, which it then converts into a 16 bit value by truncating the lowest 16 bits and rounding the 17th bit (which after the truncation will be the $1^{st}$ bit) based on the truncated 16 bits.

After 105, the process performs (at 110) a first pre-multiplication operation for a first 1D iDCT operation. In some embodiments, the first pre-multiplication operation entails multiplying each coefficient of the data array that remains after 105 by a value of a following pre-multiplication array (A):

| $c4$ | $c1$ | $c2$ | $c3$ | $c4$ | $c3$ | $c2$ | $c1$ | (A) |
|---|---|---|---|---|---|---|---|---|
| $c4$ | $c1$ | $c2$ | $c3$ | $c4$ | $c3$ | $c2$ | $c1$ | |
| $c4$ | $c1$ | $c2$ | $c3$ | $c4$ | $c3$ | $c2$ | $c1$ | |
| $c4$ | $c1$ | $c2$ | $c3$ | $c4$ | $c3$ | $c2$ | $c1$ | |
| $c4$ | $c1$ | $c2$ | $c3$ | $c4$ | $c3$ | $c2$ | $c1$ | |
| $c4$ | $c1$ | $c2$ | $c3$ | $c4$ | $c3$ | $c2$ | $c1$ | |
| $c4$ | $c1$ | $c2$ | $c3$ | $c4$ | $c3$ | $c2$ | $c1$ | |
| $c4$ | $c1$ | $c2$ | $c3$ | $c4$ | $c3$ | $c2$ | $c1$ | | where $cN=\cos(N\pi/16)$.

Next, the process performs (at 115) a first 1D iDCT operation. In some embodiments, the process performs the first 1D iDCT operation according to the scaled-version of the Chen method, which is described in the above-referenced paper. The first 1D iDCT operation is either along the row direction or the column direction. In the embodiments described below, the first 1D iDCT operation is along the column direction.

After 115, the process performs (at 120) a second pre-multiplication operation for a second 1D iDCT operation. In some embodiments, the second pre-multiplication operation entails multiplying each coefficient of the data array that remains after 105 by a value of the pre-multiplication array (A).

Next, the process performs (at 125) a second 1D iDCT operation. Like the first 1D iDCT operation, the process performs the second 1D iDCT operation according to the scaled-version of the Chen method, which is described in the above-referenced paper. The second 1D iDCT operation can also be either along the row direction or the column direction. In the embodiments described below, the second 1D iDCT operation is along the row direction.

From 125, the process transitions to 130. At 130, the process divides by four each coefficient in the data array that remains after 125. This division is part of the iDCT pre-multiplication operation, which the process 100 divides into three stages 110, 120, and 130. By splitting the pre-multiplication operation into separate stages, the process maintains larger coefficient values that result in less precision loss when fixed-point multiplication is used.

After 130, the process divides (at 135) each coefficient by the scalar value S that it used as the multiplier at 105. When the scalar value is 16, the division at 135 entails shifting down each coefficient by four bits. Although 130 and 135 are illustrated as two separate operations in FIG. 1, one of ordinary skill will realize that both operations can be performed simultaneously. For instance, when the scalar value is 16, the process can perform 130 and 135 by shifting down each coefficient by six bits.

Like iDCT decoding, DCT encoding is a separable two-dimensional (2D) transform operation. The separable nature of the DCT encoding operation can be exploited by (1) performing a first one-dimensional (1D) DCT operation in the column direction of the image block to produce a 1D encoded block, and then (2) performing a second 1D DCT operation in the row direction of the 1D encoded block to produce a 2D encoded block. Alternatively, the first 1D DCT operation can be performed in the row direction of the block and the second 1D DCT operation performed in the column direction of the block.

The scaled-version of the Chen method can be used to perform the two 1D DCT operations. This scaled-version is described in the paper "2D Discrete Cosine Transform," which can be found on the internet at, incorporated herein by reference. The Chen algorithm is an efficient implementation of the DCT operation that requires a fewer number of computations than a straightforward implementation of the DCT. While a straightforward implementation of the DCT requires a number of computations that is proportional to $N^2$ (where N=8 for an 8-point DCT), the Chen algorithm exploits symmetry and periodicity inherent in the DCT calculation to reduce the number of computations to an amount proportional to N log(N).

Figure 2:
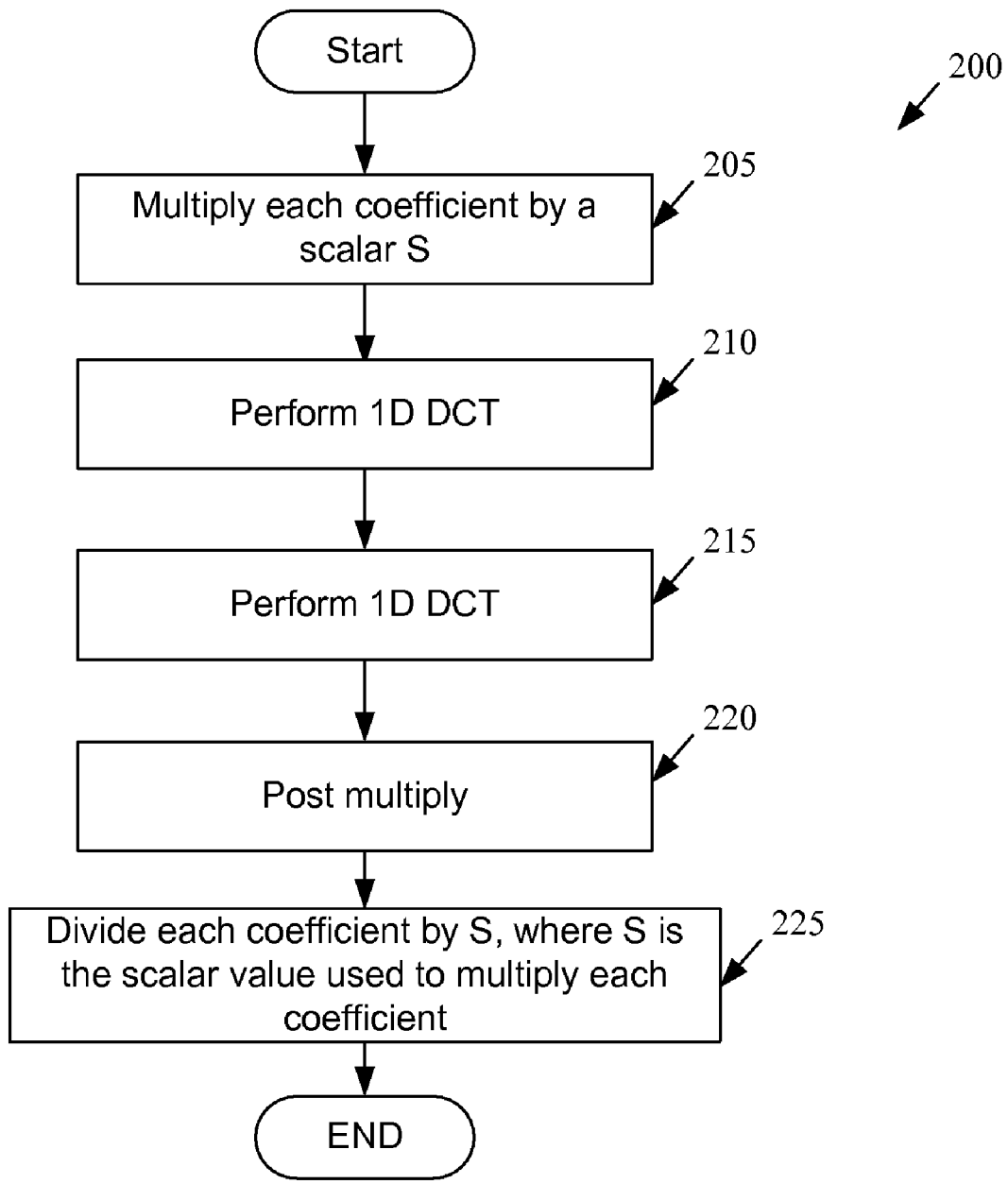
FIG. 2 illustrates a process that performs a 2D DCT operation.

FIG. 2 illustrates a process 200 that performs a 2D DCT operation. This process encodes a data array of coefficients. As shown in FIG. 2, the process 200 initially multiplies (at 205) each coefficient in the data array by a scalar value S. Some embodiments use a scalar value of 16, and hence perform the multiplication by shifting up each coefficient in the data array by four bits. Some of these embodiments shift each coefficient of by four bits for the reason described above for some embodiments of FIG. 1.

After 205, the process performs (at 210) a first 1D DCT operation. In some embodiments, the process performs the first 1D DCT operation according to the scaled-version of the Chen method, which is described in the second paper referenced above. The first 1D DCT operation is either along the row direction or the column direction. In the embodiments described below, the first 1D DCT operation is along the column direction.

After 210, the process performs (at 215) a second 1D DCT operation. Like the first 1D DCT operation, the process performs the second 1D DCT operation according to the scaled-version of the Chen method, which is described in the second paper referenced above. The second 1D DCT operation can also be either along the row direction or the column direction. In the embodiments described below, the second 1D DCT operation is along the row direction.

Next, at 220, the process performs a post multiply operation, according to the scaled-version of the Chen method. After 220, the process divides (at 225) each coefficient by the scalar value S that it used as the multiplier at 205. When the scalar value is 16, the division at 225 entails shifting down each coefficient by four bits. Although 220 and 225 are illustrated as two separate operations in FIG. 2, one of ordinary skill will realize that both operations can be performed simultaneously.

When 2D DCT encoding and decoding processes are separated into two 1D DCT operations or two 1D iDCT operations, transpose operations are typically performed between the 1D operations. Conventionally, two transpose operations are used in each of the encoding and decoding processes. One approach uses only one transpose operation in each of the encoding and decoding processes, as disclosed in U.S. patent application Ser. No. 10/427,889 filed Apr. 30, 2003, entitled "Video Encoding and Decoding," now U.S. Pat. No. 7,376,280, which is incorporated herein by reference.

Figure 3:
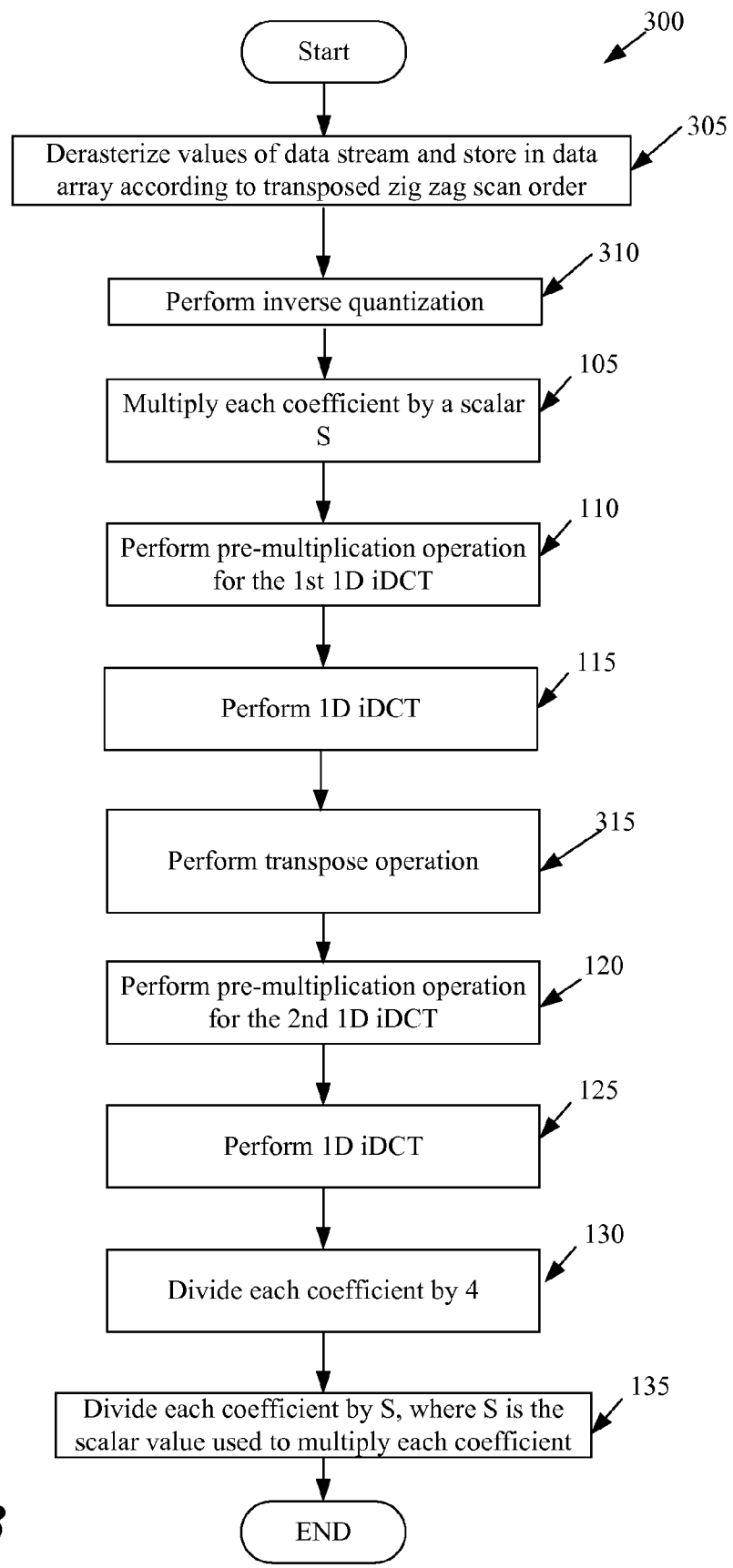
FIG. 3 illustrates a process that receives a DCT-encoded data stream, generates a DCT-encoded block, and decodes the block using only one transpose operation.

FIG. 3 illustrates a process 300 that receives a DCT-encoded data stream, generates a DCT-encoded block, and decodes the block using only one transpose operation. The operations of the process 300 are similar to the operations of the process 100 of FIG. 1. Hence, similar numbers are used to described similar operations in these figures.

The process 300 starts when it receives a data stream of encoded values. The process 300 parses out and derasterizes (at 305) the values of the data stream and stores the values in a data array according to a transposed zig-zag scan order. The transposed zig-zag scan order is identical to a conventional zig-zag scan order except that it has been flipped symmetrically about the diagonal line that connects the top-left and the bottom-right corners of the data array. The process then performs (at 310) an inverse quantization process on the data array. For an MPEG encoding, the inverse quantization entails multiplying each value of the data array by a value of a transposed quantization matrix. The transposed quantization matrix is a transposed version of the quantization matrix used by conventional MPEG inverse quantizers.

The process 300 then multiplies (at 105) each coefficient in the data array by a scalar value S. The process performs (at 110) a first pre-multiplication operation for a first 1D iDCT operation. Next, the process performs (at 115) a first 1D iDCT operation. The first 1D iDCT operation is either along the row direction or the column direction. In the embodiments described below, the first 1D iDCT operation is along the column direction.

The process next performs (at 315) a transpose operation on the coefficients of the data array that exists after 115. A transpose operation interchanges the row and columns of an array. In other words, a transpose $A^T$ of an array A is an array that is symmetrically related to the array A, such that row i in $A^T$ is column j in A, and column j in $A^T$ is row i in A.

The process then performs (at 120) a second pre-multiplication operation for a second 1D iDCT operation. Next, the process performs (at 125) a second 1D iDCT operation. The second 1D iDCT operation can also be either along the row direction or the column direction. In the embodiments described below, the second 1D iDCT operation is along the row direction. The process then divides (at 130) by four each coefficient in the data array that remains after 125. The process then divides (at 135) each coefficient by the scalar value S that it used as the multiplier at 105. The process then ends.

Figure 4:
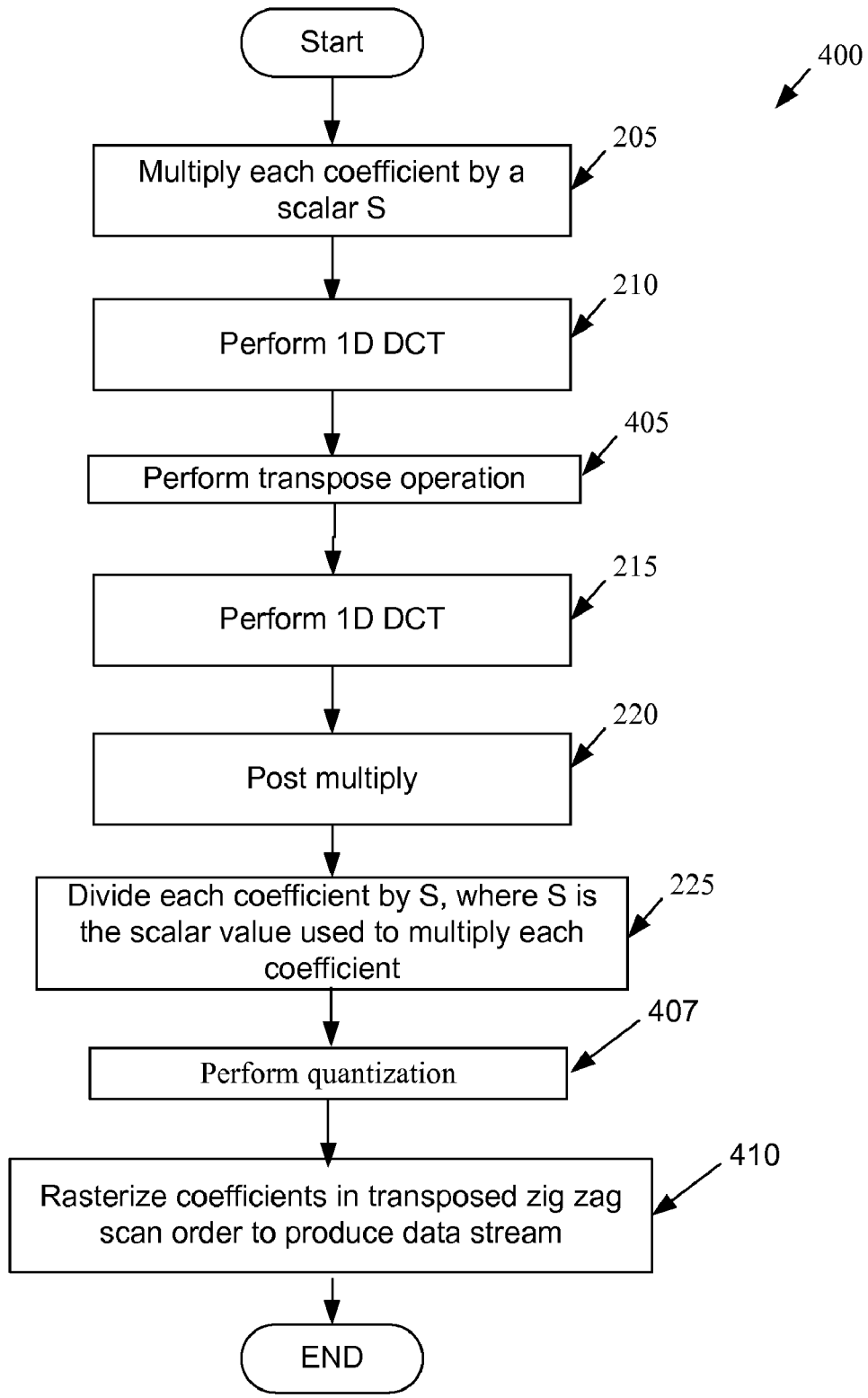
FIG. 4 illustrates a process that DCT encodes a data array and outputs the DCT-encoded data array using only one transpose operation.

FIG. 4 illustrates a process 400 that DCT encodes a data array of coefficients and outputs the DCT-encoded data array using only one transpose operation. The operations of the process 400 are similar to the operations of the process 200 of FIG. 2. Hence, similar numbers are used to described similar operations in these figures.

As shown in FIG. 4, the process 400 initially multiplies (at 205) each coefficient in the data array by a scalar value S. The process then performs (at 210) a first 1D DCT operation. The first 1D DCT operation is either along the row direction or the column direction. In the embodiments described below, the first 1D DCT operation is along the column direction.

The process next performs (at 405) a transpose operation on the coefficients of the data array that exists after 210. The process performs (at 215) a second 1D DCT operation. The second 1D DCT operation can also be either along the row direction or the column direction. In the embodiments described below, the second 1D DCT operation is along the row direction. Next, at 220, the process performs a post multiply operation, according to the scaled-version of the Chen method. After 220, the process divides (at 225) each coefficient by the scalar value S that it used as the multiplier at 205.

The process then performs (at 407) a quantization operation. For an MPEG encoding, the quantization entails multiplying each value of the data array (that exists after 225) by a value of a transposed quantization matrix. The process then rasterizes (at 410) the coefficients of the data array remaining after 407 in a transposed zig-zag scan order to produce a data stream. The process then ends.

While the invention has been described with reference to numerous specific details, one of ordinary skill in the art will recognize that the invention can be embodied in other specific forms without departing from the spirit of the invention. Several embodiments described above relate to MPEG compression. One of ordinary skill in the art, however, will realize that the invention can relate to other types of compression, such as H.263 compression. However, if other compression techniques are used, some of the aspects of the above-described processes might have to be modified.

We claim:

1. A method of decoding an encoded video frame comprising a data array of coefficients that has been encoded according to a two-dimensional (2D) transform encoding operation that is separable into two one-dimensional (1D) transform operations, the method comprising:
   multiplying each coefficient in the data array by a first pre-multiplication value from a pre-multiplication array, the pre-multiplication array having a row direction and a column direction, wherein the pre-multiplication values in the pre-multiplication array along one of said row direction and said column direction have a same value, wherein a plurality of pre-multiplication values in the pre-multiplication array along the other of said row direction and said column direction have different values;
   performing a first 1D inverse transform on the data array resulting from the multiplying by the first pre-multiplication value;
   multiplying each coefficient in the data array resulting from the first 1D inverse transform by a second pre-multiplication value from said pre-multiplication array;
   performing a second 1D inverse transform on the data array resulting from the multiplying by the second pre-multiplication value; and
   by a video decoder, generating a decoded video frame from said data array.

2. The method of claim 1 further comprising:
   dividing each coefficient in the data array resulting from the second 1D inverse transform by four.

3. The method of claim 1, wherein the first 1D inverse transform is performed on a first dimension of the data array resulting from the multiplying by the first pre-multiplication value.

4. The method of claim 3, wherein the second 1D inverse transform is performed on a second dimension of the data array resulting from the multiplying by the second pre-multiplication value.

5. The method of claim 4, wherein the first dimension corresponds to one of said row direction and said column direction in the data array and the second dimension corresponds to a direction that is different than the first dimension.

6. The method of claim 1, wherein the data array of coefficients is defined in a frequency domain.

7. The method of claim 6, wherein generating the decoded video frame comprises producing a decoding that is in a spatial domain.

8. The method of claim 1, wherein the first and second 1D inverse transforms correspond to first and second stages of performing a two-dimensional Inverse Discrete Cosine Transform (iDCT).

9. The method of claim 1 further comprising dividing each value in the data array resulting from the second 1D inverse transform by a predefined value.

10. The method of claim 1, wherein the encoded video frame comprises a plurality of macroblocks.

11. The method of claim 10, wherein each macroblock in the plurality of macroblocks comprises sub-sections of luminance and chrominance blocks.

12. The method of claim 1, wherein the data array of coefficients is an n by m pixel image block, wherein n and m are integers.

13. A method comprising:
   by a video decoder, decoding a data stream of values that has been encoded according to a two-dimensional (2D) transform encoding operation that is separable into two one-dimensional (1D) transform operations, said decoding comprising:
      parsing encoded values out of the data stream and creating a two-dimensional data array that stores the encoded values in a particular scan order, wherein the values in the created data array are encoded in both dimensions of the array;
      multiplying each value in the data array by a first pre-multiplication value from a pre-multiplication array;
      performing a first 1D inverse transform on the data array resulting from the multiplying;
      transposing the data array resulting from the first 1D inverse transform;
      multiplying each value in the data array resulting from the transposing by a second pre-multiplication value from said pre-multiplication array; and
      performing a second 1D inverse transform on the data array resulting from the multiplying by the second pre-multiplication value to produce a data array comprising decoded values, the data array comprising decoded values being produced without a second transposing operation.

14. The method of claim 13 further comprising:
   dividing each value in the data array resulting from the second 1D inverse transform by four.

15. The method of claim 13, wherein the particular scan order is a transposed zig-zag scan order.

16. A method for increasing precision resulting from a video decoding operation that converts a set of encoded values of a first domain to a set of decoded values of a second domain by splitting an inverse discrete cosine transform pre-multiplication operation into two separate operations, the method comprising:

performing, by a video decoder, a first conversion operation comprising multiplying each encoded value in the set of encoded values by a pre-multiplication value stored in a pre-multiplication array, the pre-multiplication array having a row direction and a column direction, wherein the pre-multiplication values in the pre-multiplication array along one of said row direction and said column direction have a same value, wherein a plurality of pre-multiplication values in the pre-multiplication array along the other of said row direction and said column direction have different values; and performing, by the video decoder, a second conversion operation to produce the set of decoded values, the second conversion operation comprising multiplying each value in a set of values resulting from performing the first conversion operation on the set of encoded values by a pre-multiplication value stored in said pre-multiplication array.

17. The method of claim 16 further comprising amplifying the precision by increasing a number of bits used to represent each value in the set of encoded values.

18. The method of claim 16, wherein the first domain comprises a continuous domain and the second domain comprises a discrete domain.

19. The method of claim 18, wherein the first domain is a frequency domain and the second domain is a discretized spatial domain.

20. The method of claim 16, wherein the first conversion operation further comprises performing a first inverse transform operation on the set of encoded values after applying the first pre-multiplication value to the set of encoded values.

21. The method of claim 20, wherein the second conversion operation further comprises performing a second inverse transform operation on the set of values resulting from the first conversion operation after applying the second pre-multiplication value to said set of values.

22. The method of claim 16 further comprising producing decoded content using the set of values resulting from performing the second conversion operation.

* * * * *